(12) United States Patent
Scales

(10) Patent No.: US 8,504,071 B2
(45) Date of Patent: *Aug. 6, 2013

(54) APPARATUS AND METHOD FOR USE IN LOCATION DETERMINATION

(71) Applicant: Nokia Corporation, Espoo (FI)

(72) Inventor: James Scales, Berkshire (GB)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,949

(22) Filed: Dec. 5, 2012

(65) Prior Publication Data

US 2013/0095854 A1 Apr. 18, 2013

Related U.S. Application Data

(63) Continuation of application No. 13/416,761, filed on Mar. 9, 2012, which is a continuation of application No. 11/767,210, filed on Jun. 22, 2007, now Pat. No. 8,160,617.

(51) Int. Cl.
*H04W 24/00* (2009.01)

(52) U.S. Cl.
USPC .............. 455/456.1; 455/456.5; 455/456.6; 455/404.2; 455/410; 340/539.13

(58) Field of Classification Search
USPC ...... 455/404.2, 456.1–457, 410; 340/539.13, 340/988–996
See application file for complete search history.

(56) References Cited

U.S. PATENT DOCUMENTS

| | | |
|---|---|---|
| 5,490,079 A | 2/1996 | Sharpe |
| 5,537,102 A | 7/1996 | Pinnow |
| 5,812,087 A | 9/1998 | Krasner |
| 5,841,396 A | 11/1998 | Krasner |
| 5,874,914 A | 2/1999 | Krasner |
| 5,945,944 A | 8/1999 | Krasner |
| 5,999,124 A | 12/1999 | Sheynblat |

(Continued)

FOREIGN PATENT DOCUMENTS

| | | |
|---|---|---|
| CN | 1119891 | 4/1996 |
| EP | 1197924 | 4/2002 |

(Continued)

OTHER PUBLICATIONS

European Search Report for App. No. 10 07 5747; completed Feb. 10, 2011.

(Continued)

*Primary Examiner* — Patrick Edouard
*Assistant Examiner* — Ronald Eisner
(74) *Attorney, Agent, or Firm* — Alston & Bird LLP

(57) ABSTRACT

An apparatus is provided that includes circuitry configured for location determination arranged to obtain a geographic location of the apparatus; circuitry configured receiving connection point identification data, the connection point identification data useable in providing a wireless communication path to a remote circuitry providing a connection point, and wherein the connection point identification data is associated with a geographic location of the remote circuitry; and circuitry configured for associating one or more instances of the geographic location of the apparatus, as provided by the circuitry configured for location determination, with corresponding instances of the connection point identification data. This associating may be used to cross-check/validate the geographical location provided by the circuitry configured for location determination.

18 Claims, 4 Drawing Sheets

U.S. PATENT DOCUMENTS

| | | |
|---|---|---|
| 6,061,018 A | 5/2000 | Sheynblat |
| 6,087,965 A | 7/2000 | Murphy |
| 6,201,803 B1 | 3/2001 | Munday et al. |
| 6,208,290 B1 | 3/2001 | Krasner |
| 6,215,442 B1 | 4/2001 | Sheynblat et al. |
| 6,232,916 B1 | 5/2001 | Grillo et al. |
| 6,369,755 B1 | 4/2002 | Nichols et al. |
| 6,509,830 B1 | 1/2003 | Elliott |
| 6,636,740 B1 | 10/2003 | Ramesh |
| 6,774,797 B2 | 8/2004 | Freathy et al. |
| 6,799,052 B2 | 9/2004 | Agness et al. |
| 6,934,631 B2 | 8/2005 | Dentinger et al. |
| 7,250,903 B1 | 7/2007 | McDowell |
| 7,321,305 B2 | 1/2008 | Gollu |
| 7,358,857 B1 | 4/2008 | White |
| 7,606,938 B2 | 10/2009 | Roese et al. |
| 8,160,617 B2 | 4/2012 | Scales |
| 2002/0017977 A1 | 2/2002 | Wall |
| 2002/0021245 A1 | 2/2002 | Lin et al. |
| 2002/0038182 A1 | 3/2002 | Wong et al. |
| 2004/0121774 A1 | 6/2004 | Rajkotia et al. |
| 2004/0219904 A1 | 11/2004 | De Petris |
| 2005/0026626 A1 | 2/2005 | Carl et al. |
| 2005/0037775 A1 | 2/2005 | Moeglein et al. |
| 2005/0049787 A1 | 3/2005 | Cho |
| 2005/0148368 A1 | 7/2005 | Scheinert et al. |
| 2005/0246093 A1 | 11/2005 | Olague et al. |
| 2005/0285747 A1 | 12/2005 | Kozlay |
| 2006/0176174 A1 | 8/2006 | Gollu et al. |
| 2007/0298761 A1 | 12/2007 | Bani Hani |
| 2008/0037482 A1 | 2/2008 | Douglas et al. |
| 2012/0173141 A1 | 7/2012 | Scales |

FOREIGN PATENT DOCUMENTS

| | | | |
|---|---|---|---|
| JP | 2004-46305 | * | 2/2004 |
| KR | 2002-0006015 | | 1/2002 |
| WO | WO-2004/064342 | | 7/2004 |
| WO | WO-2005/083461 | | 9/2005 |

OTHER PUBLICATIONS

First Office Action for Chinese Patent App. No. 200880103697.8; dated May, 24 2011.

International Search Report and Written Opinion for App. No. PCT/EP2008/004936, dated Dec. 9, 2008.

Office Action for U.S. Appl. No. 11/767,210; dated Apr. 14. 2010.

Office Action for U.S. Appl. No. 11/767,210; dated Jan. 11, 2011.

Office Action for U.S. Appl. No. 11/767,210; dated Jul. 13, 2011.

Warner, J. S., et al.; "GPS Spoofing Countermeasures;" Dec. 2003; Homeland Security Portal; retrieved on Sep. 21, 2011 from: <http://www.homelandsecurity.org/bulletin/dual%20benefit/warner_gps_spoofing.html>.

* cited by examiner

APPARATUS AND METHOD FOR USE IN LOCATION DETERMINATION

RELATED APPLICATIONS

The present application is a continuation application of U.S. Non-Provisional application Ser. No. 13/416,761, entitled "Apparatus and Method for Use in Location Determination," filed Mar. 9, 2012, which is a continuation application of U.S. Non-Provisional application Ser. No. 11/767,210, entitled "Apparatus and Method for Use in Location Determination," filed Jun. 22, 2007, now U.S. Pat. No. 8,160,617, the contents of which are both hereby incorporated by reference in their entireties.

FIELD OF THE INVENTION

The invention relates to an apparatus and method for use in location determination, and associated methods of assembly of said apparatus.

BACKGROUND

A toll-collect system uses a combination of measures to ensure the correct billing of trucks/cars/motorbikes/vehicles on highways.

A truck driver has different options to pay for highway transit. He can have an onboard unit with GPS and GPRS which automatically senses the truck position and trajectory and sends this information together with truck identification data to a toll-collect server for billing purposes. The other option is a manual registration of the truck at billing stations before entering and/or upon exit of the highway.

All control measures are based on physical evidence, i.e. they detect trucks on highways and check via communication with the toll-collect server if they have paid for the highway section where they are found.

Three control methods exist: automatic billing control; stationary control measures; and mobile control teams.

In automatic billing control, automatic control bridges sense the trucks via a combination of dedicated short-range communications (DSRC) and camera object recognition. The control bridge tries to establish short-range communications to the truck in front of the bridge. If an onboard unit is installed in the truck, it responds and gives the identity of the truck. The control bridge cross-checks with the toll-collect server to determine whether or not there is adequate toll balance for the truck. In case no onboard unit is found, the camera takes pictures of the truck and detects its licence plate. The licence plate is used to check on the toll-collect server if the vehicle has correctly registered for the highway.

In stationary control measures, toll-collect personnel check toll balances manually at parking places.

In addition, mobile teams check trucks while driving on the road.

GPS positioning systems provide an accurate position, but are open to being "spoofed". For example, in the above toll-collect system, a low-cost transmitter could be fitted to the truck in order to override the authentic GPS signal with a spoof signal arranged to indicate a false location. For example, the false location may be a distribution depot at which the truck is based, or a toll-free road.

The listing or discussion of a prior-published document in this specification should not necessarily be taken as an acknowledgement that the document is part of the state of the art or is common general knowledge.

SUMMARY

According to a first aspect, there is provided an apparatus comprising circuitry configured for location determination arranged to obtain a geographic location of the apparatus;

circuitry configured for receiving connection point identification data, the connection point identification data useable in providing a wireless communication path to a remote circuitry providing a connection point, and wherein the connection point identification data is associated with a geographic location of the remote circuitry; and circuitry configured for associating one or more instances of the geographic location of the apparatus, as provided by the circuitry configured for location determination, with corresponding instances of the connection point identification data.

The geographic location(s) may comprise a point in space, an area in space or a volume in space. The geographical location(s) may be represented using one, two, or three dimensional co-ordinates.

The association of instances are such that there is a reasonable correlation between the time at which the circuitry for location determination received the geographical location, and the time at which the circuitry for receiving connection point identification data received the connection point data. Otherwise, the connection point data would not be able to be reliably used to validate the received geographical location as the apparatus may be in a different position to that associated with the originally received geographical location as provided by the circuitry for location determination.

Although in certain embodiments, the connection point identification data and the connection point may be used to make a wireless communication path to the remote circuitry, in some embodiments, the wireless communication path to that remote circuitry may not be made. For example, if the connection point identification data relates to information provided in a cellular neighbour list, the neighbouring cell may not necessary be used as a connection point.

In certain embodiments, the remote circuitry may be usable to provide one or more onward communication paths. The circuitry for receiving connection point identification data may comprise circuitry for providing wireless communication with the remote circuitry to provide one or more onward communication paths.

The apparatus may comprise a receiver only or a transceiver. In the case of receiving, the apparatus may be arranged to scan at the desired intervals in selected communication bands or standards and log possible connection data.

In this way, the apparatus can collect data on possible connection points, forming a virtual footprint, or sequence of virtual footprints, which will define the location as an area from the possible connection point data and also utilising any optionally additional data, such as the content from the neighbour lists which are available at that same time. Additionally, any specific point in time that such data is collected can be linked by time stamping, if it is not instantaneously used, and cross checked with the expected offset with connection points time to prevent time shifting by using recorded data later than when actually received.

The circuitry configured for associating may comprise storage circuitry arranged to store the association between the one or more instances of the geographic location of the apparatus, as provided by circuitry configured for location determination, and the corresponding instances of the connection point identification data.

The circuitry configured for associating may comprise remote-storage-access circuitry arranged to transmit (e.g. via wired/wireless circuitry), to a remote-storage circuitry, the geographical location(s) to provide the association between the one or more instances of the geographic location of the apparatus, as provided by circuitry configured for location determination, and the corresponding instances of the connection point identification data.

The circuitry configured for associating may comprise remote-storage-access circuitry arranged to access (e.g. via wired/wireless circuitry) remote-storage circuitry to retrieve the association between the one or more instances of the geographic location of the apparatus, as provided by circuitry configured for location determination, and the corresponding instances of the connection point identification data.

Said possible onward communication paths may comprise one or both of audio data and video data communication paths.

The remote circuitry may comprise a cellular network element. The connection point identification data may comprise a cell ID of the cellular network element, which is an available connection property seen by the circuitry configured for wireless communications even when it is not in an active call. A full cell ID often includes a Cell Global Identity (CGI), Mobile Country Code (MCC), a Mobile Network Code (MNC), a Local area Code (LCC) and the Cell ID (CI) itself. The cell ID may comprise other elements including postal address/postcode/nearest railway-station/nearest metro-station/nearest highway-exit/GPS-location details/latitude/longitude.

The remote circuitry may comprise a WLAN access point, and the connection point identification data comprises one or both of an IP address and a MAC address of the WLAN access point.

The apparatus may comprise processing circuitry operable to compare the geographic location of the apparatus, as provided by the circuitry configured for location determination, with corresponding instances of the geographic location, as provided by the connection point identification data, to perform a cross-check operation. The apparatus may perform the cross-check operation in real time, or the data may be logged to a storage unit to be validated later.

In this way, the apparatus is configured to use intrinsically freely available possible connection data as a validity check. It need not be just the user's operator that the apparatus makes a connection via, but the data offered by all possible connection points in the current real location of the apparatus which are at that point in time visible to the apparatus. The intrinsic data available to the apparatus is often not seen by the user, but is available to the circuitry of the apparatus. In most devices, the user only sees a subset of the data, such as an area code, but from the full data a more precise location for a specific cell in a cluster that makes up the area code can be found. For example, each cell has its location and a service maximum radius based on its power, which serves as a good guide even though there might be geographic variations because of local topographic aspects.

The cross-check operation may be performed in relation to a single instance of remote circuitry (for example a base station in the cellular case) or some or all of the remote circuitries in the vicinity. The ability to include more or less data may be user-selectable.

The processing circuitry may be arranged to determine whether or not the geographic location of the apparatus, as provided by the circuitry configured for location determination, is within a predetermined range of the geographic location, as provided by the connection point identification data, in order to perform the cross-check operation.

The predetermined range may comprise a maximum communications range of the remote circuitry, the maximum communications range being the maximum range within which an apparatus can communicate over the air interface with the remote circuitry using circuitry configured for wireless communication.

The circuitry configured for location determination may be arranged to use a satellite source to obtain the geographic location of the apparatus (e.g. GPS, Galileo).

The circuitry configured for location determination may be arranged to use a land-based source to obtain the geographic location of the apparatus.

The land-based source may comprise one or more of a cellular telecommunications network, a WLAN, a BLUETOOTH network, and a radio-frequency identification (RFID) tag reader.

The land and satellite based sources may be used together to provide the geographical location of the apparatus (e.g. Assisted GPS).

The circuitry configured for location determination may be arranged to use dead reckoning circuitry to obtain the geographic location of the apparatus.

The remote circuitry may comprise one or more of a cellular telecommunications network, a WLAN, a Bluetooth™ network, and a radio-frequency identification (RFID) tag reader.

The circuitry configured for location determination may be arranged to obtain the geographic location of the apparatus by receiving the geographic location from an external source. This may be from a neighbouring apparatus which provides (e.g. via a short range radio link e.g. Bluetooth™) the geographical location of itself and/or an approximation or the actual geographical location of the apparatus.

The apparatus may be arranged to obtain the geographic location(s) and associated connection point identification data at one or more repeated time intervals. An update rate may be selectable. Updates may be done at fixed time intervals, randomly, dynamically or on-demand as the user or a service provider wishes.

The apparatus may be arranged to log the geographic location(s) and associated connection point identification data within the apparatus.

The apparatus may be arranged to upload the geographic location(s) and associated connection point identification data to a remote server in real time.

The apparatus may be arranged to upload the geographic location(s) and associated connection point identification data to a remote server in non-real time.

The apparatus may be arranged to use received connection point identification data relating to a plurality of connection points in associating one or more instances of the geographic location of the apparatus, as provided by the circuitry configured for location determination, with corresponding instances of the connection point identification data. These plurality of connection points may be different types of connection points (e.g. a cellular network element, a WLAN access point etc). One or more of the plurality of received connection points may be selected, for example, based on which of the connection points is considered to have provided the most reliable (e.g. based on most recently received and/or most to accurate connection point identification data) geographical location. In certain embodiments, the selection need not be based on the most accurate, but based on a check that the majority of the data contained in the list is possible within that defined location. The selection may be restricted to specific connection points in instances of some geographic restriction on position, for example, when a user may be under house arrest.

According to a second aspect, there is provided an apparatus comprising
- means for obtaining a geographic location of the apparatus;
- means for receiving connection point identification data, the connection point identification data useable in providing a wireless communication path to a means for providing a connection point, and wherein the connection point identification data is associated with a geographic location of the means for providing a connection point; and
- means for associating one or more instances of the geographic location of the apparatus, as provided by the circuitry configured for location determination, with corresponding instances of the connection point identification data.

The apparatus of the second aspect may comprise any of the features of the apparatus of the first aspect.

According to a third aspect, there is provided a computer-readable medium having computer-executable components comprising
- a first component arranged to receive a geographic location of an apparatus;
- a second component arranged to receive connection point identification data useable in providing a wireless communication path to a remote circuitry providing a connection point, and wherein the connection point identification data is associated with a geographic location of the remote circuitry; and
- a third component arranged to associate one or more instances of the geographic location of the apparatus, as provided by the first component, with corresponding instances of the connection point identification data.

The computer-executable components may comprise a fourth component arranged to compare the geographic location of the apparatus with the geographic location of the remote circuitry in order to perform a cross-check operation.

The fourth component may be arranged to determine whether or not the geographic location of the apparatus is within a predetermined range of the geographic location of the remote circuitry, in order to perform the cross-check operation.

The computer-executable components may be arranged to obtain the geographic location(s) and associated connection point identification data over one or more time intervals.

The computer-executable components may be arranged to log the geographic location(s) and associated connection point identification data.

The computer-executable components may be arranged to upload the geographic location(s) and associated connection point identification data to a remote server in real time.

The computer-executable components may be arranged to upload the geographic location(s) and associated connection point identification data to a remote server in non-real time.

According to a fourth aspect, there is provided a method comprising
- obtaining a geographic location of an apparatus;
- receiving connection point identification data, the connection point identification data useable in providing a wireless communication path to a remote circuitry providing a connection point, the connection point identification data being associated with a geographic location of the remote circuitry; and
- associating one or more instances of the geographic location of the apparatus, as provided by obtaining the geographical location of the apparatus, with corresponding instances of the connection point identification data.

The method may comprise storing the association between the one or more instances of the geographic location of the apparatus, as provided by obtaining the geographical location of the apparatus, and the corresponding instances of the connection point identification data.

The method may comprise accessing remote storage circuitry to retrieve the association between the one or more instances of the geographic location of the apparatus, as provided by obtaining the geographical location of the apparatus, and the corresponding instances of the connection point identification data.

The method may comprise comparing the geographic locations in order to perform a cross-check operation.

The method may comprise determining whether or not the geographic location of the apparatus, as provided by obtaining the geographical location of the apparatus, is within a predetermined range of the geographic location, as provided by the connection point identification data, in order to perform the cross-check operation.

The method may comprise using a satellite source to obtain the geographic location of the apparatus.

The method may comprise using a land-based source to obtain the geographic location of the apparatus.

The method may comprise using dead reckoning circuitry to obtain the geographic location of the apparatus.

The method may comprise obtaining the geographic location of the apparatus by receiving the geographic location from an external source.

The method may comprise obtaining the geographic location of the apparatus by taking a geographic location reading.

The method may comprise repeatedly obtaining the geographic locations of the both the apparatus and associated connection point identification data over repeated time intervals.

The method may comprise logging the repeated geographic locations and associated connection point identification data within the apparatus.

The method may comprise uploading the repeated geographic locations and associated connection point identification data to a remote server in real time.

The method may comprise uploading the repeated geographic locations and associated connection point identification data to a remote server in non-real time.

According to a fifth aspect, there is provided a method comprising
- the step of obtaining a geographic location of the apparatus;
- the step of receiving connection point identification data, the connection point identification data useable in providing a wireless communication path to a remote circuitry providing a connection point, the connection point identification data being associated with a geographic location of the remote circuitry; and
- the step of associating one or more instances of the geographic location of the apparatus, as provided by the step of obtaining a geographical location of the apparatus, with corresponding instances of the connection point identification data.

The method of the fifth aspect may comprise any of the features of the method of the fourth aspect.

According to a sixth aspect, there is provided a computer program comprising program code means adapted to perform any of the steps of the methods of the fourth or fifth aspect when the program is run on a processor.

According to a seventh aspect, there is provided a computer program product comprising program code means stored in a computer-readable medium, the program code means being adapted to perform any of the steps of the methods of the fourth or fifth aspect when the program is run on a processor.

According to an eighth aspect, there is provided an apparatus comprising
  circuitry configured for location determination arranged to obtain a geographic location of the apparatus;
  circuitry configured for interfacing arranged to interface with circuitry configured for wireless communications arranged to undertake wireless communications with remote circuitry to provide one or more onward communication paths using the remote circuitry, by obtaining connection point identification data of the remote circuitry, the connection point identification data being associated with a geographic location of the remote circuitry, the circuitry configured for interfacing being arranged to receive one or more connection point identification data from the circuitry configured for wireless communications; and
  circuitry configured for associating one or more instances of the geographic location of the apparatus, as provided by the circuitry configured for location determination, with corresponding instances of the connection point identification data.

The apparatus of the eighth aspect may include any of the features of the apparatus of the first aspect.

According to a ninth aspect, there is provided an apparatus comprising
  circuitry configured for location determination arranged to obtain a geographic location of the apparatus;
  circuitry configured for indicating movement of the apparatus;
  circuitry configured for determining that a static geographic location of the apparatus as obtained by the circuitry configured for location determination is false in the case that the circuitry configured for indicating movement indicates movement of the apparatus.

The circuitry configured for location determination may include any of the features of the corresponding circuitry of the apparatus of the first aspect.

The circuitry configured for indicating movement may comprise, for example, a speedometer, an accelerometer, or circuitry to receive an output of a speedometer or accelerometer.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation. Associated methods of assembly of the apparatus are also within the present disclosure.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

Figure 1:
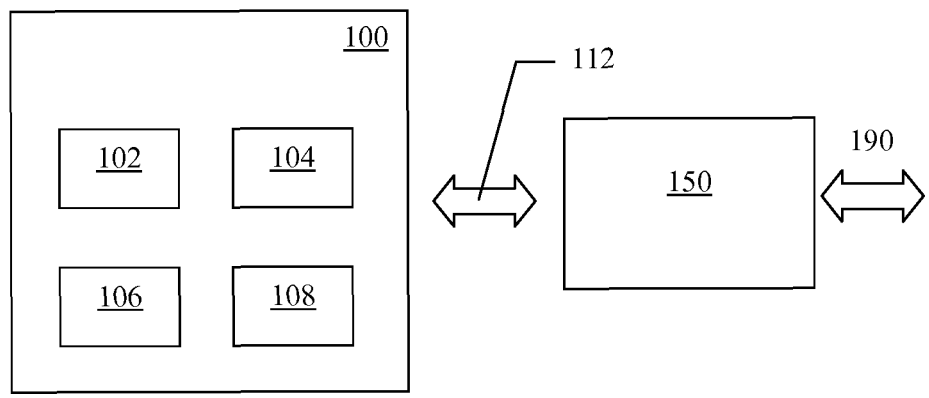
—
  FIG. 1 is a schematic diagram of an apparatus in wireless communications with a remote server.

FIG. 1 shows an apparatus 100 for use in location determination, for example, of a vehicle. The apparatus may be used for location determination of mobile equipment/people/items for which location determination is important. The apparatus may be integrated with the mobile item or be separate to it.

The apparatus 100 functions as a data logger for keeping track of the geographic location of a vehicle. The log may be used to calculate road tax for the vehicle, or for toll collection or insurance purposes, for example. It will be appreciated that the data logger may have other applications besides tracking vehicles. Furthermore, the "data logger" can perform the function of logging/storage of geographical location data for later validation, and/or instant validation of geographical location data.

As shown in FIG. 1, the apparatus 100 comprises circuitry 102 configured for location determination, circuitry 104 configured for wireless communications, circuitry 106 configured for associating, and processing circuitry 108, all of which will now be described.

Figure 2:
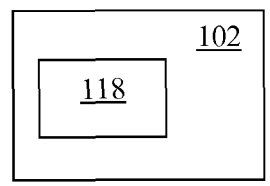
FIG. 2 is a schematic diagram of a component of the apparatus of FIG. 1.

The circuitry 102 configured for location determination is arranged to obtain a geographic location of the apparatus 100. In this embodiment, the circuitry 102 configured for location determination is arranged to use a satellite source, for example the GPS or Galileo systems, to obtain the geographic location of the apparatus 100. In another embodiment, the circuitry 102 configured for location determination is arranged to use a land-based source, for example one or more of a cellular telecommunications network, a WLAN, a Bluetooth network, and a radio-frequency identification (RFID) tag reader, to obtain the geographic location of the apparatus 100. In yet another embodiment, the circuitry 102 configured for location determination is arranged to use dead reckoning circuitry 118 to obtain the geographic location of the apparatus (see FIG. 2). In this embodiment, the circuitry 102 configured for location determination is arranged to obtain the geographic location of the apparatus 100 by taking a geographic location reading itself. In another embodiment, the circuitry 102 configured for location determination is arranged to obtain the geographic location of the apparatus 100 by receiving the geographic location from an external source.

The circuitry 104 configured for wireless communications is arranged to undertake wireless communications 112 with remote circuitry 150 to provide a possible onward communication path 190 using the remote circuitry 150. In this embodiment, the onward communication path 190 comprises an audio data and video data communication path. In another embodiment, the communication path 190 may carry other data (e.g. GPRS data).

The onward communication path 190 may provide onward wired and/or wireless communication with another apparatus (not shown). The "another apparatus" may be in direct (physical/wired/optical/wireless) communication with the remote circuitry 150 or may be connected (via physical/wireless network components) to the remote circuitry 150 via intermediate network circuitry (not shown). The circuitry 104 configured for wireless communications obtains connection point identification data of the remote circuitry 150 during the wireless communications 112, the connection point identification data being associated with a geographic location of the remote circuitry 150. In addition, the circuitry 104 may be configured for wireless communications to obtain the connection point identification data of remote circuitries 150' with which it has not connected (not shown in FIG. 1), but which are available to provide onward communication paths 190, as the remote circuitries 150' may be actively announcing their presence to the apparatus 100. Such announcements may be made for the purpose of making emergency calls.

In this embodiment, the remote circuitry 150 comprises a cellular network element and the connection point identification data comprises a full cell ID of the cellular network element. In another embodiment, the connection point identification data comprises a partial cell ID, for example a local area code (e.g. geographical telephone code e.g. 0181 for London, UK). The network element may belong to an operator to which the user has subscribed, or to another operator to which the user has not subscribed. In another embodiment, the remote circuitry 150 comprises a WLAN access point and the connection point identification data comprises an IP address and a MAC address of the WLAN access point. In other embodiments, the remote circuitry 150 comprises a Bluetooth network element or a radio-frequency identification (RFID) tag reader. In such embodiments, the location of the remote circuitry 150 is fixed.

The circuitry 106 configured for associating is operable to associate one or more instances of the geographic location of the apparatus 100 with corresponding instances of the connection point identification data, in order that a cross-check operation can be performed, as described below. Each instance of the geographic location of the apparatus and the corresponding instance of the geographic location of the connection point identification data are associated by having been obtained within a predetermined time interval of each other.

Figure 3:
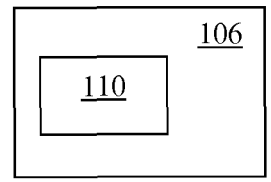
FIG. 3 is a schematic diagram of another component of the apparatus of FIG. 1.

In this embodiment, the circuitry 106 configured for associating comprises storage circuitry 110 (see FIG. 3) arranged to store the association between the one or more instances of the geographic location of the apparatus 100 and the corresponding instances of the connection point identification data.

Figure 4:
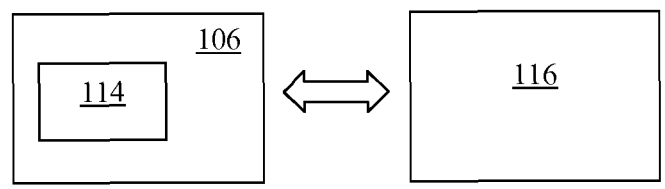
FIG. 4 is a schematic diagram of another component of the apparatus of FIG. 1 in communication with remote storage circuitry.

In another embodiment, the circuitry 106 configured for associating comprises remote-storage-access circuitry 114 (see FIG. 4) arranged to access remote-storage circuitry 116 to retrieve the association between the one or more instances of the geographic location of the apparatus 100 and the corresponding instances of the connection point identification data. The storage circuitry 110 and remote storage circuitry 116 also store times, and optionally also dates, at which the instances the geographic locations were obtained. In such embodiments, the circuitry 106 may transmit the geographical location information from circuitry 102 and 104 for association in the remote-storage circuitry 116.

The processing circuitry 108 is operable to compare the geographic location of the apparatus 100 with the geographic location of the remote circuitry 150 (i.e. an approximation of the geographical location of the apparatus 100) in order to perform a cross-check operation. In this embodiment, the processing circuitry 108 is arranged to determine whether or not the geographic location of the apparatus 100 is within a predetermined range of the geographic location of the remote circuitry 150, in order to perform the cross-check operation. The predetermined range comprises a maximum communications range of the remote circuitry 150.

In this way, it can be determined whether or not the circuitry 102 configured for location determination has been spoofed.

For example, in the case that the circuitry 102 obtains the geographic location of the apparatus 100 using the GPS system, the vehicle owner may install a spoofing device in the vehicle which transmits spoof signals to the circuitry 102 that override the genuine GPS signals, in order to fool the circuitry 102 into recording the location of the vehicle as the vehicle owner's home. The vehicle owner may hope to avoid paying road tax or highway tolls in this way.

However, by cross-checking the geographic location of the apparatus 100 as obtained by the circuitry 102 with the geographic location of remote circuitry 150 within range of which the apparatus 100 has passed, it can be determined that the circuitry 102 has been spoofed. It is possible to validate each location of the apparatus 100 with the connection point identification data locations to check that they are in the correct vicinity as part of the post processing applied to any data upload on the central system.

In this embodiment, the apparatus 100 is arranged to repeatedly obtain the geographic locations of the both the apparatus 100 and one or more remote circuitries 150 over time, and to log the repeated geographic locations. In this embodiment, the geographic location of the apparatus 100 is logged at specified intervals, and the full set of connection point identification data that the apparatus 100 has seen in the last time interval are logged in association with that geographic location of the apparatus 100. In another embodiment, the apparatus 100 is configured to function in a one-time-use mode in which the connection point identification data is obtained at the vehicle owner's request or in response to a specific action by the owner (for example when the owner accesses a mapping service to show his GPS location on a map) or in response to a request received via the circuitry 104 for wireless communications.

Figure 5:
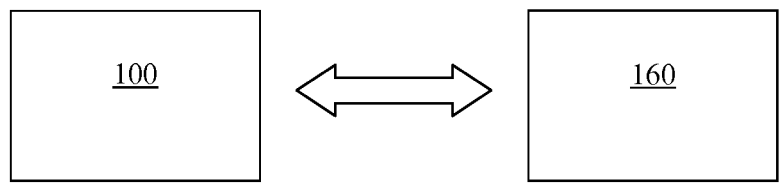
FIG. 5 is a schematic diagram of the apparatus of FIG. 1 in communications with a remote server.

In this embodiment, the apparatus 100 is arranged to upload the repeated geographic locations to a remote server 160 in non-real time (see FIG. 5), for example in an on-demand pull mode of operation. This may be done at a lower cost time, for example when an operator has agreed to provide lower costs to work out of peak hours. In another embodiment, the apparatus 100 is arranged to upload the repeated geographic locations to the remote server 160 in real time, although the network load may be prohibitive to perform such active real-time tracking of millions of vehicles or individuals. The connected cell at the time of upload of data in most instances would be the vehicle owner's home.

The apparatus 100 can be low cost since it only needs, in its simplest form, a state machine to record data at set time intervals.

In one example, the apparatus 100 is used to track the location of a person, who moves into a shopping arcade or mall. The GPS data may be lost but the last position indicates the edge of the structure. The base station cell ID could be that of a repeater and hence not offer the best location. The connection point identification data may include those of WLAN, Bluetooth™ or other connection points, which provide the final confirmation that the user is within the structure. In this case, all services (cellular, WLAN, Bluetooth™) may be used to assist. Each service advertises and the apparatus 100 is arranged to select which one it uses. The apparatus 100 may start with its default connection service, e.g. GSM, GPRS, 3G etc.

At start up of the apparatus 100, the circuitry 104 configured for wireless communications scans and finds possible connection cells and connects to the one that is from the user's operator. Other cells for other operators are likely to be in the same area. The apparatus 100 then registers with that selected cell, and can now make calls and receive calls. The apparatus 100 hands over to the next cell from the same operator when the apparatus 100 moves. The apparatus 100 checks for the next cells and looks at a series of signal qualities to perform this switch. Essentially, the apparatus 100 looks in set intervals to see what connection points are in the vicinity, and so the apparatus 100 has a view of several cells. The apparatus 100 may only chirp to the cell at selected intervals to maintain registration with it so that it can make calls and equally important so that it can receive calls since the system knows with which cell it is registered. The apparatus 100 does not just see cells from the user's operator, but all cells within the same band or available to that service.

Figure 9:
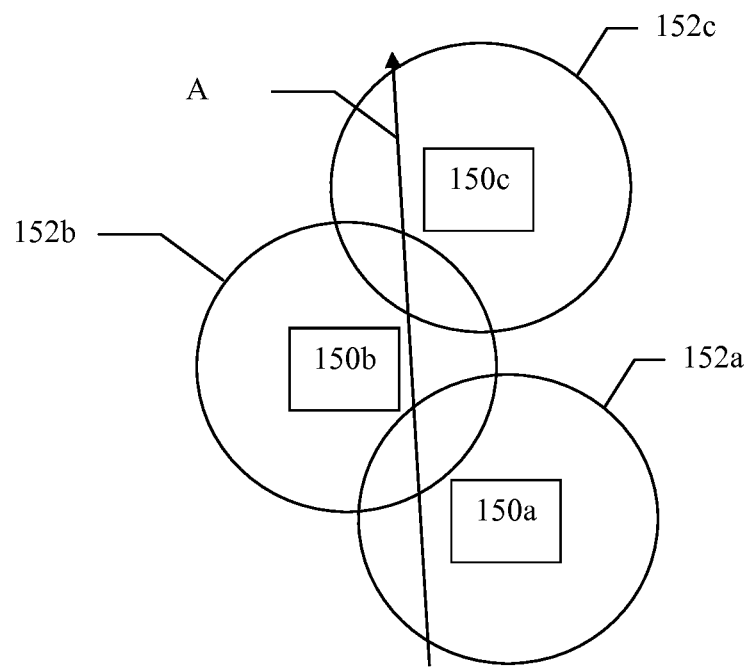
FIG. 9 shows an arrow A representing movement of the apparatus of FIG. 1 or FIG. 8 in an exemplary scenario.

FIG. 9 shows an arrow A representing movement of the apparatus 100 in an exemplary scenario. The apparatus 100 passes within range of a first remote circuitry 150*a*, a second remote circuitry 150*b* and a third remote circuitry 150*c* as it moves along. The ranges of the remote circuitries are represented by respective overlapping circles 152*a*, 152*b*, and 152*c*. The remote circuitries 150*a-c* may be owned by different operators, and may have different ranges which overlap to varying extents.

Figure 6:
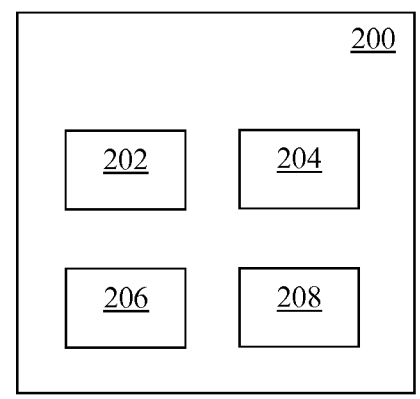
FIG. 6 is a schematic diagram of a computer-readable medium having computer-executable components stored thereon.

FIG. 6 shows a computer-readable medium 200 having computer-executable components comprising a first component 202, a second component 204, a third component 206, and a fourth component 208. These functions of these components are described below.

The first component 202 is arranged to receive a geographic location of an apparatus 100.

The second component 204 is arranged to receive connection point identification data of remote circuitry 150 obtained during wireless communications between circuitry 104 for communications of the apparatus 100 and the remote circuitry 150. The wireless communications with the remote circuitry 150 provide a possible onward communication path 190 using the remote circuitry 150. The connection point identification data is associated with a geographic location of the remote circuitry 150.

The third component 206 is arranged to associate one or more instances of the geographic location of the apparatus 100 with corresponding instances of the connection point identification data.

The fourth component 208 is arranged to compare the geographic location of the apparatus 100 with the geographic location of the remote circuitry 150 in order to perform a cross-check operation. The fourth component 208 is further arranged to determine whether or not the geographic location of the apparatus 100 is within a predetermined range of the geographic location of the remote circuitry 150, in order to perform the cross-check operation.

The computer-executable components are arranged repeatedly to obtain the geographic locations of the both the apparatus 100 and one or more remote circuitries 150 over time, and to log the repeated geographic locations.

In this embodiment, the computer-executable components are arranged to upload the repeated geographic locations to a remote server 160 in real time. In another embodiment, the computer-executable components are arranged to upload the repeated geographic locations to the remote server 160 in non-real time.

Figure 7:
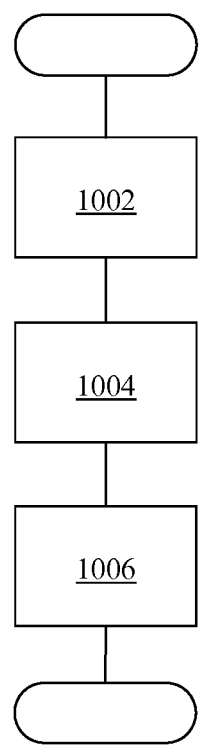
FIG. 7 is a flowchart representing a method for use in location determination.

FIG. 7 shows a method for use in location determination. The method includes the steps of (1002) obtaining a geographic location of an apparatus 100; (1004) undertaking wireless communications with remote circuitry 150 to provide one or more possible onward communication paths 112 using the remote circuitry 150, by obtaining connection point identification data of the remote circuitry 150, the connection point identification data being associated with a geographic location of the remote circuitry 150; and (1006) associating one or more instances of the geographic location of the apparatus 100 with corresponding instances of the connection point identification data. The step (1004) may occur before the step (1002), and/or both steps may be performed at the same time.

In a variant to the embodiments above, the apparatus includes dead reckoning circuitry to validate geographic location data obtained from a satellite system, for example GPS. In a simple version, a vehicle velocity above zero is used to identify that the GPS system has been spoofed using a signal which represents a static location, for example the vehicle owner's home.

In another variant, the processing circuitry 118 forms part of the remote server 160, such that the cross-check operation is done centrally. In this way, a user-initiated option may be provided which is validated by a service provider.

In another variant, the circuitry 104 for wireless communications does not form part of the apparatus and forms part of a separate unit. In one example, the circuitry 104 forms part of a burglar alarm installed in the vehicle and communicates with the remote circuitry 150 for reasons other than those described herein. The apparatus 100 is arranged to receive the connection point identification data obtained during those communications and to use the connection point identification data in the manner described above. In another variant, the circuitry 104 forms part of an in-car phone.

Figure 8:
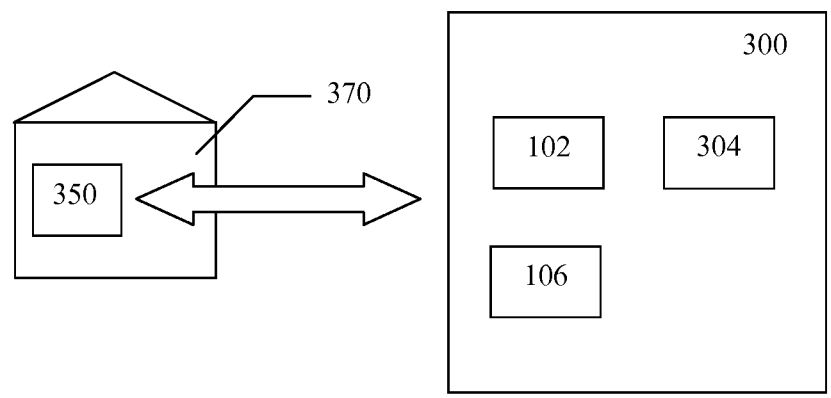
FIG. 8 is a schematic diagram of an apparatus for use in imposing house arrest or prisoner curfews.

FIG. 8 shows an apparatus 300 for use in imposing house arrest or prisoner curfews.

The apparatus 300 takes the form of a tag which is fixedly attached to the prisoner's ankle and can only be removed using special equipment. The details of such attachment are known in the art and are outside the scope of this disclosure.

The tag 300 comprises circuitry 102 for location determination and circuitry 106 for associating which are identical to those of apparatus 100.

The tag 300 further comprises circuitry 304 for wireless communications arranged to undertake wireless communications 112 with remote circuitry 350 to provide a possible onward communication path using the remote circuitry 150. In this embodiment, the onward communication path 190 provides for the communication of the geographic location data collected by the circuitry 102 for location determination to a central monitoring server (not shown). The onward communication path 190 may provide onward wired and/or wireless communication with another apparatus (not shown). The "another apparatus" may be in direct (physical/wired/optical/wireless) communication with the remote circuitry 350 or may be connected (via physical/wireless network components) to the remote circuitry 350 via intermediate network circuitry (not shown). The apparatus 300 obtains connection point identification data of the remote circuitry 350 during the wireless communications 112, the connection point identification data being associated with a geographic location of the remote circuitry 350.

In this embodiment, the remote circuitry 350 comprises a home unit installed at the prisoner's home. The connection point identification data comprises an IP address and a MAC address of the home unit 350. Given that the home unit 350 does not move, the IP/MAC address of the home unit 350 also provides the geographical location of a device (e.g. tag 300) connected to the home unit when a connection is made by the device with that home unit 350.

The function of the tag 300 and home unit 350 is as described in relation to the corresponding components of the apparatus 100 and remote circuitry 150 above, except that the processing circuitry 108 forms part of the central monitoring server. The tag 300 and home unit 350 cooperate to provide a geographic location of the prisoner which is not readily spoofed.

The prisoner may have been instructed to report to the home unit 350 at a particular time. The home unit 350 may be configured to cover the reporting and data collection at the same time.

The home unit 350 may be placed on charge so that no excuse for it not working can be given.

In one example implementation, the apparatus 100, 300 includes a GPS receiver and cellular circuitry. The cellular network provides a coarse geographical location position, which for example is accurate to within a 10 km range. The GPS receiver provides a more accurate fix, which for example is accurate to within 20 m range. The accurate position fix provided by the GPS can be validated by cross-checking that it lies within the 10 km range indicated by the cellular network. The cellular circuitry may be suitable for providing a (e.g. GPRS) data connection and/or audio/video telephony functions.

In another example implementation, the apparatus 100, 300 includes a GPS receiver and WLAN circuitry. The WLAN network provides a coarse geographical location position, which for example is accurate to within a 100 m range. The GPS receiver provides a more accurate fix, which for example is accurate to within a 20 m range. The accurate position fix provided by the GPS can be validated by cross-checking that it lies approximately within the 100 m range indicated by the WLAN network.

In another example implementation, the apparatus 100, 300 includes WLAN circuitry and cellular circuitry. The cellular network provides a coarse geographical location position, which for example is accurate to within a 10 km range. The WLAN circuitry provides a more accurate fix, which for example is accurate to within 100 m range. The accurate position fix provided by the WLAN circuitry can be validated by cross-checking that it lies within the 10 km range indicated by the cellular network.

In one example, the connection point ID data and the GPS data could be associated with one another following a signal received from a remote apparatus. For example, in the case of device theft, a signal could be sent from a remote apparatus to the device to start the association of the GPS data with the connection point (e.g. Cell ID) data. Such data could be sent to the remote apparatus to keep accurate track of the actual location of the stolen device.

It will be appreciated that the aforementioned circuitry may have other functions in addition to the mentioned functions, and that these functions may be performed by the same circuit.

It will be appreciated that one or more data elements provided with a connection point (i.e. not necessarily all the connection point data elements (e.g. not all of the cell ID elements) may be used to perform the association/validation.

It will be appreciated that the associated geographical data need not be validated (e.g. checking which of the data are correct/checking for discrepancies in determined geographical location/checking for possible spamming) in real time, and that validation could occur at some later time. In the latter case, the respective data would just be logged on an appropriate storage circuitry.

Validation may be based on the particular cellular network element communication radii and/or the power of transmissions between the network element and the apparatus 100 being used to define the possible radii within which the apparatus 100 may be located. Furthermore, the known distribution of user authorised network operators (i.e. wireless connection point providers) can be used to check to see whether connection data recorded is possible. Spamming/errors may be considered to be detected after detection of one or more errors (or based on a number of errors within a given time frame, given that the apparatus 100 may not always be in the line of sight of geographical location data).

It will be appreciated that the connection point data which is used in the association need not be provided from the network element (e.g. cell/basestation) which is used for onward communication but by other connection points which are other possible connection points. Furthermore, there may be embodiments in which the connection points themselves cannot be used for onward communication themselves (e.g. in the case that the user is not authorised to use them (e.g. the cellular network element of a network operator that the user is not authorised to use or the WLAN access point of a neighbour who has only allowed access using an unknown security key. The connection point data in some systems may comprise additional information about the properties of adjacent connection points (e.g. cells) for a particular operator. This may be in the form of a so-called "neighbour list" which is used to provide connection point data of adjacent cells which can be optionally used when making a telephone call.

It will be appreciated that connection point data may be obtained from a number of possible connection points in the vicinity and the data received from one or more of these connection points used to validate the geographical location data.

Such connection point data would comprise incidental or normally hidden data available at the connection point which is advantageously used to perform a time stamped cross-check validation of the geographical location data.

Although the embodiments described discuss circuitry 104 for wireless communication, in other embodiments, the circuitry 104 can be arranged to scan for connection point data (and/or just receive connection point data) transmitted by one or more connection points, and may not necessary be able to be used to make one or more of an audio/video/message (email, SMS, MMS)/data (e.g. GPRS)/control communication connection with the respective connection points. In such a case, a simple form of the apparatus 100 including such circuitry 104 would not, for example, be able to be used to make a voice call.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   a processor; and
   a memory having computer program code stored thereon, wherein the memory and the
   computer program code are configured to, when run on the processor, cause the apparatus to:
   obtain a first geographic location for a mobile item;
   receive intrinsically freely available connection point identification data from a connection point in the vicinity of the mobile item to provide a second geographic location for the mobile item, the connection point identification data being useable in providing a wireless communication path to a remote circuitry capable of providing a connection point for the mobile item or a mobile cellular device, the connection point identification data being associated with a geographic location of the remote circuitry, said associated geographic location of the remote circuitry being used to provide the second geographic location for the mobile item;
   associate one or more instances of the first and second geographic locations for the mobile item;
   compare the one or more associated instances of the first and second geographic locations to provide a cross-check to determine whether the first geographic location for the mobile item is a spoofed geographic location for the mobile item; and
   associate the one or more instances of the first and second geographic locations based on the respective times of receipt of the first geographic location and connection point identification data, and wherein the connection point identification data is time stamped to prevent falsification of the respective time of receipt using recorded data.

2. The apparatus of claim 1, wherein the remote circuitry comprises a cellular network element, and wherein the connection point identification data comprises a Cell ID of the cellular network element.

3. The apparatus of claim 2, wherein the Cell ID comprises one or more of a Cell Global Identity, a Mobile Country Code, a Mobile Network Code, a Local Area Code, a postal address, a post code, an identification of the nearest railway station, an identification of the nearest metro station, an identification of the nearest highway exit, GPS location details, and latitude and longitude coordinates.

4. The apparatus of claim 2, wherein the cellular network element belongs to an operator which the user has subscribed to or to an operator which the user has not subscribed to.

5. The apparatus of claim 1, wherein the remote circuitry comprises a WLAN access point, and wherein the connection point identification data comprises one or both of an IP address and a MAC address of the WLAN access point.

6. The apparatus of claim 1, wherein the apparatus is configured to use one or more of an external source, a satellite source, a land-based source and dead reckoning circuitry to obtain the first geographic location.

7. The apparatus of claim 1, wherein the apparatus is configured to receive the connection point identification data without establishing a wireless communication path to the remote circuitry.

8. The apparatus of claim 1, wherein the connection point identification data comprises information about other connection points in the vicinity of the mobile item.

9. The apparatus of claim 1, wherein the remote circuitry is usable to provide one or more onward communication paths.

10. The apparatus of claim 1, wherein the apparatus is configured to associate the one or more instances of the first and second geographic locations on receipt of a signal from a remote apparatus.

11. The apparatus of claim 1, wherein the apparatus is configured to provide the cross-check by identifying whether the first geographic location is within a predetermined range of the second geographic location.

12. The apparatus of claim 1, wherein the apparatus is integrated in the mobile item or is separate from the mobile item.

13. An apparatus comprising:
   circuitry configured to obtain a first geographic location for a mobile item;
   circuitry configured to receive intrinsically freely available connection point identification data from a connection point in the vicinity of the mobile item to provide a second geographic location for the mobile item, the connection point identification data being useable in providing a wireless communication path to a remote circuitry capable of providing a connection point for the mobile item or a mobile cellular device, the connection point identification data being associated with a geographic location of the remote circuitry, said associated geographic location of the remote circuitry being used to provide the second geographic location for the mobile item;
   circuitry configured to associate one or more instances of the first and second geographic locations for the mobile item;
   circuitry configured to compare the one or more associated instances of the first and second geographic locations to provide a cross-check to determine whether the first geographic location for the mobile item is a spoofed geographic location for the mobile item; and circuitry configured to associate the one or more instances of the first and second geographic locations based on the respective times of receipt of the first geographic location and connection point identification data, and wherein the connection point identification data is time stamped to prevent falsification of the respective time of receipt using recorded data.

14. The apparatus of claim 13, wherein the circuitry configured to receive the connection point identification data comprises interface circuitry configured to interface with wireless communications circuitry, the wireless communications configured to receive the connection point identification data wirelessly from the remote circuitry, the interface circuitry configured to receive the connection point identification from the wireless communications circuitry.

15. The apparatus of claim 13, wherein the circuitry configured to receive the connection point identification data comprises wireless communications circuitry configured to receive the connection point identification data wirelessly from the remote circuitry.

16. A method comprising:
  obtaining, by use of an apparatus, a first geographic location for a mobile item;
  receiving, by use of an apparatus, intrinsically freely available connection point identification data from a connection point in the vicinity of the mobile item to provide a second geographic location for the mobile item, the connection point identification data being useable in providing a wireless communication path to a remote circuitry capable of providing a connection point for the mobile item or a mobile cellular device, the connection point identification data being associated with a geographic location of the remote circuitry, said associated geographic location of the remote circuitry being used to provide the second geographic location for the mobile item;
  associating, by use of an apparatus, one or more instances of the first and second geographic locations for the mobile item;
  comparing, by use of an apparatus, the one or more associated instances of the first and second geographic locations to provide a cross-check to determine whether the first geographic location for the mobile item is a spoofed geographic location for the mobile item; and
  associating, by use of an apparatus, the one or more instances of the first and second geographic locations based on the respective times of receipt of the first geographic location and connection point identification data, and wherein the connection point identification data is time stamped to prevent falsification of the respective time of receipt using recorded data.

17. A system configured to perform the method of claim 16.

18. A non-transitory computer-readable medium comprising computer code, the computer code configured to:
  obtain a first geographic location for a mobile item;
  receive intrinsically freely available connection point identification data from a connection point in the vicinity of the mobile item to provide a second geographic location for the mobile item, the connection point identification data being useable in providing a wireless communication path to a remote circuitry capable of providing a connection point for the mobile item or a mobile cellular device, the connection point identification data being associated with a geographic location of the remote circuitry, said associated geographic location of the remote circuitry being used to provide the second geographic location for the mobile item;
  associate one or more instances of the first and second geographic locations for the mobile item; and
  compare the one or more associated instances of the first and second geographic locations to provide a cross-check to determine whether the first geographic location for the mobile item is a spoofed geographic location for the mobile item; and
  associate the one or more instances of the first and second geographic locations based on the respective times of receipt of the first geographic location and connection point identification data, and wherein the connection point identification data is time stamped to prevent falsification of the respective time of receipt using recorded data.

* * * * *